A. SWENCKI.
COMBINED LAND AND WATER VEHICLE.
APPLICATION FILED JULY 28, 1921.
1,420,783.
Patented June 27, 1922.
2 SHEETS—SHEET 2.
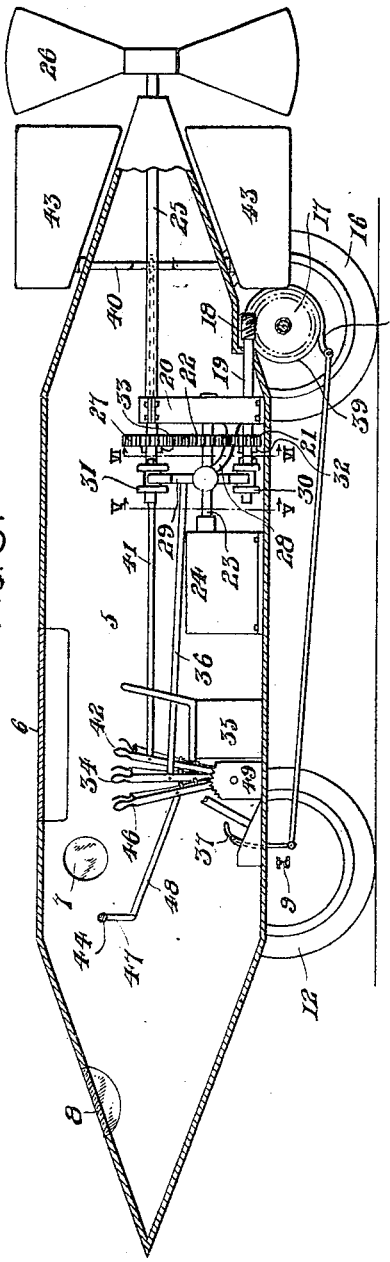
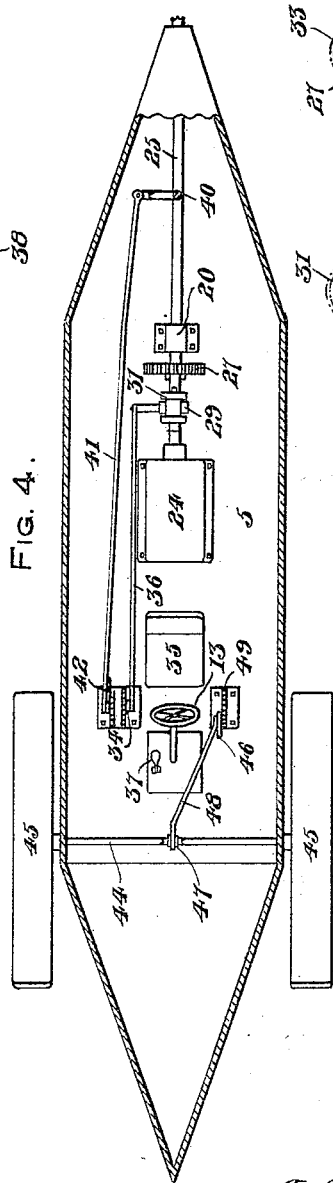
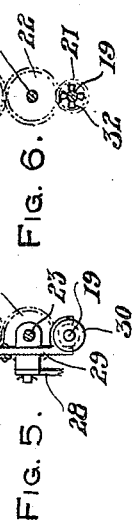
Inventor
A. Swencki
By J. K. Bryant
Attorney

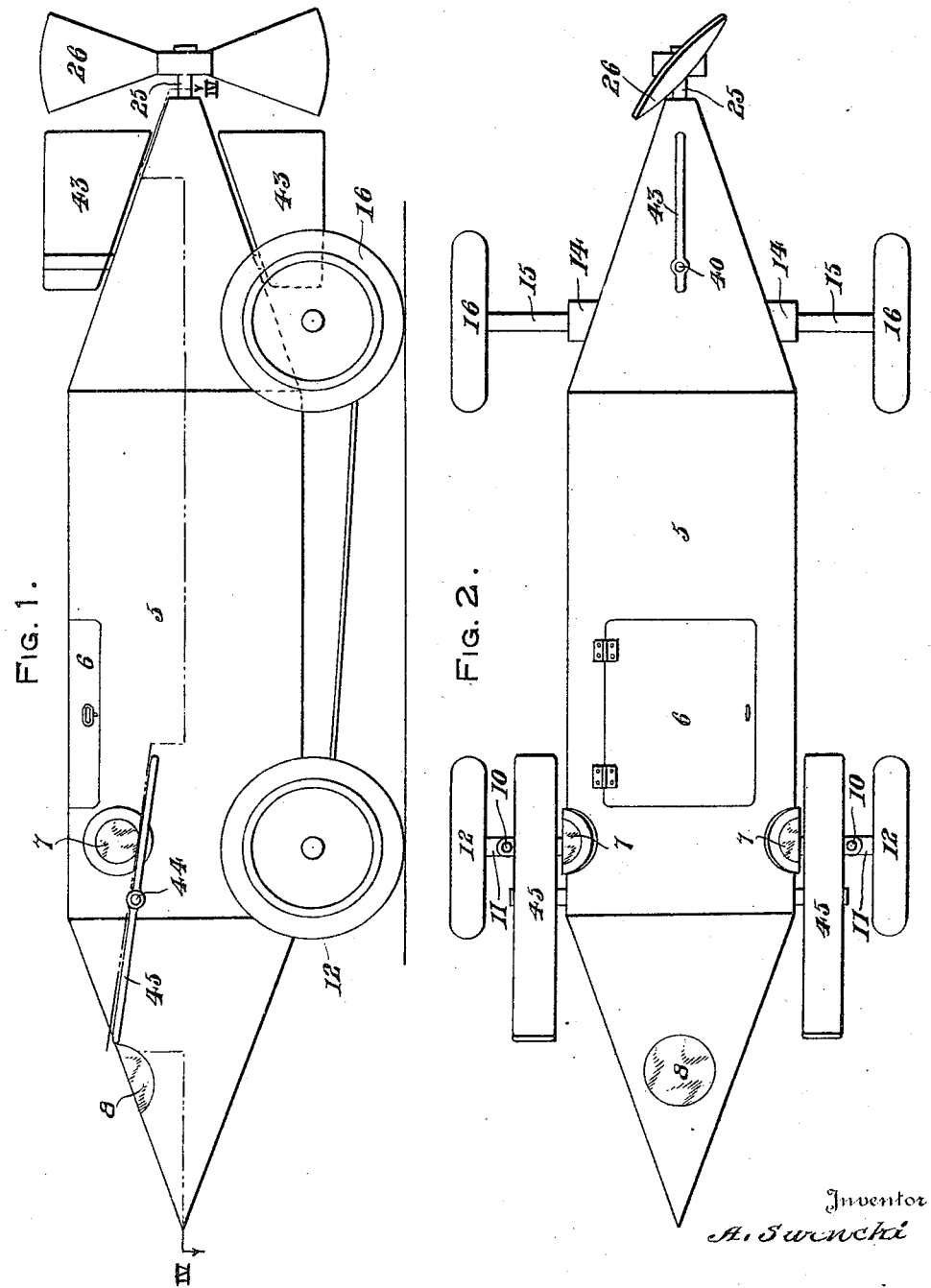

UNITED STATES PATENT OFFICE.

ANTON SWENCKI, OF RACINE, WISCONSIN.

COMBINED LAND AND WATER VEHICLE.

1,420,783.  Specification of Letters Patent.  Patented June 27, 1922.

Application filed July 28, 1921. Serial No. 488,146.

*To all whom it may concern:*

Be it known that I, ANTON SWENCKI, a citizen of the United States of America, residing at Racine, in the county of Racine and State of Wisconsin, have invented certain new and useful Improvements in Combined Land and Water Vehicles, of which the following is a specification.

This invention relates to certain new and useful improvements in combined land and water vehicles and has particular reference to that type of vehicle adapted to travel equally as well upon the water as upon the land and which embodies interchangeably employed driving mechanism consisting of gearing to the axle of the rear wheels and gearing to a propeller from a common motor.

The invention aims to generally simplify and improve devices of the above kind and to provide a simple and efficient means for manually connecting one driving means while simultaneously disconnecting the other from the engine.

Another object is to provide a combined land and water vehicle involving a watertight hollow body adapted to assume a position either partly or completely covered by the water and having means disposed therein for the convenient guiding of the same including front steering wheel mechanism for use upon land and rear rudders for use in the water.

With the above general objects in view and others that will appear as the nature of the invention is better understood, the same consists in the novel form, combination and arrangement of parts hereinafter more fully described in connection with the accompanying drawings and in which like characters of reference indicate similar parts throughout the several views.

In the drawings,

Figure 1 is a side elevational view of a combined land and water vehicle constructed in accordance with the present invention, Figure 2 is a top plan view thereof.

Figure 3 is a view of the device shown in Figure 1 partly in central longitudinal section and partly in side elevation, Figure 4 is a horizontal sectional view with parts removed and taken substantially upon line IV—IV of Figure 1, Figure 5 is a vertical sectional view taken substantially upon line V—V of Figure 3, and Figure 6 is a view taken substantially upon line VI—VI of Figure 3.

Referring more in detail to the several views, the present invention embodies a body 5 of hollow substantially watertight construction and preferably of cylindrical form at its central portion with its ends tapering so as to provide a stream-line effect at both ends as clearly shown, the cylindrical portion of the body being provided with an opening in its top portion for the entrance and exit of the driver or passengers adapted to be closed by a hinged door 6 of any well known form. Suitable glass covered port holes may be provided at the forward side portions of the body as at 7 and in the forward tapered portion as at 8 so that the driver may have sufficient view ahead and to the sides to enable him to properly steer the vehicle.

The body 5 may be suitably mounted upon a transverse forward axle 9 having steering knuckles 10 and stub axles 11, upon which stub axles the front supporting wheels 12 are journaled and which may be suitably connected with the steering wheel 13 within the forward portion of the body in the well known manner followed in the construction of automobiles for enabling the driver to properly guide the vehicle.

The body 5 also has a rear axle housing 14 in which the transverse rear axle 15 is journaled, said rear axle being provided with rear supporting wheels 16 and having a worm gear 17 suitably secured thereon so as to mesh with a worm 18 fixed upon the rear end of a shaft 19 which is journaled in a bracket 20 fixed in an upright position at the rear portion of the body. The shaft 19 extends through the lower part of the body and at its forward end portion is provided with a small spur gear 21. Fixed upon the power shaft 23 of a suitable motor 24 which shaft 23 may also be journaled in the bracket 20 above the shaft 19, is another gear 22 in constant mesh with gear 21. Another shaft 25 has its forward end portion journaled in the bracket 20 above the shaft 23 and extends rearwardly through the axial center portion of the body 5 where it has a propeller 26 secured upon the end thereof exteriorly of the body. A portion of the shaft 25 projects a slight distance forwardly of the bracket 20 and has a large spur gear 27 loosely mounted thereon in mesh with the gear 22, it being noted that the gear 21 is also loosely mounted upon the shaft 19 so that said gears may normally rotate freely without causing rotation of the shafts 19 and 25. The bracket 20 is provided with a forwardly extending arm 28 which terminates at a point forwardly of the gears 21, 22, and 27, and a double ended clutch shifting fork or lever 29 is pivoted to said arm 28 upon a horizontal axis with its ends engaging slidable clutch members 30 and 31 respectively provided upon the shafts 19 and 25 for engagement with clutch elements 32 and 33 rigid with the adjacent faces of the gears 21 and 27. The arrangement is such that when the lever 29 is vertically disposed, both of the clutches are disengaged or in neutral position so that drive is not communicated to either of the shafts 19 or 25 from the power shaft 23, although by tilting the upper end of the lever 29 rearwardly, the shaft 25 may be driven for operating the propeller 26 while the shaft 19 is idle, or by tilting the lower end of the lever 29 rearwardly, power will be transmitted to the shaft 19 for driving the rear axle 15 while the propeller 26 is idle. A suitable hand lever is provided as at 34 adjacent the driver's seat 35 for tilting the lever 29 by connecting said lever 34 with the lever 29 by means of a connecting rod 36. The driver's seat is arranged forwardly of the motor 24 and preferably in convenient relation to a foot lever 37 which may be connected in any suitable manner to a brake band 38 passing around a brake drum 39 upon the rear axle for stopping the vehicle as is usual with automobiles.

A vertical crank shaft 40 is journaled through the body 5 rearwardly of the bracket 20 and has its central crank portion pivotally connected to a rod 41 which is pivoted at its forward end to a lever 42 provided beside the lever 34, and the upper and lower projecting ends of the crank shaft 40 have rudder members 43 fastened thereon so that the vehicle may be effectively guided in the water.

A shaft 44 is arranged horizontally and transversely of the body 5 forwardly of the driver's seat 35 and has its ends journaled and extending through the sides of said body, and a longitudinally tiltable plane 45 is fixed upon each end of said shaft 44 close to the adjacent side of the body which planes are employed for controlling ascent or descent of the vehicle in the water by a suitable rotation of the shaft 44 through the medium of a lever 46 which is connected with a crank arm 47 of the shaft 44 by means of a rod 48. The levers 34 and 42 are preferably disposed at one side of the driver's seat and the lever 46 is disposed at the other side of said seat, while suitable segments and catches are provided for all of said hand levers so as to maintain the same in any of their shifted positions as generally denoted by the numeral 49.

When traveling upon land, the clutch shifting lever 29 has its lower end tilted rearwardly by proper forward adjustment of the hand lever 34 so as to provide a driving connection from the motor to the rear axle through the gearing described, the motor 24 thrown into and out of operation in any well known way and the driving connection to the shaft 25 being then broken, the rear wheels 16 will be propelled while the propeller 26 is idle and the front wheels 12 may be conveniently steered by operation of the steering wheel 13.

When travelling in the water, the lever 34 will be forced rearwardly so as to break the driving connection between the shaft 23 and the shaft 19 and to provide a driving connection through the gears 22 and 27 from the power shaft 23 to the shaft 25 thus causing rotation of the propeller 26 and forward movement of the device. By properly shifting the lever 42, the rudder members 43 will be swung to the desired side for guiding the vehicle to either side or said rudder elements may be kept parallel with the longitudinal axis of the body for steering straight ahead. Should the driver desire to submerge, the planes 45 may be properly tilted by shifting the lever 46 rearwardly and when desiring to again come to the surface, said planes may be shifted in the reverse direction by moving the lever 46 forwardly.

From the foregoing description, it is believed that the construction and operation of this invention will be readily understood and appreciated by those skilled in the art and minor changes may be made therein without departing from the spirit and scope of the invention.

What is claimed as new is:

In a combined land and water vehicle, a hollow water-tight body having a motor supported therein with a rearwardly extending power shaft, an upright bracket mounted within the body and having the rear end of said power shaft journaled therein and provided with a forwardly extending arm, a gear fixed upon the power shaft between the forward end of the arm and the bracket, a short shaft extending longitudinally of the body beneath the power shaft and journaled in said bracket, said shaft having a gear loosely mounted thereon in mesh with the first named gear and further having its rear end extended through the body, front and rear supporting wheels for said body, a driving axle carrying the rear supporting wheels and rotatably geared to the rear end of the second named shaft, a third shaft journaled in the bracket above the power shaft and extending axially of the body through the rear end of the latter, a propeller mounted upon the projecting rear end of the last named shaft, a third gear loosely mounted upon said last named shaft in mesh with the gear fixed upon the power shaft, and manually operable means within the body for clutching or unclutching the gears from the second and third named shafts.

In testimony whereof I affix my signature.

ANTON SWENCKI.